United States Patent [19]

White

[11] Patent Number: 4,668,861

[45] Date of Patent: May 26, 1987

[54] TACTILE SENSOR EMPLOYING A LIGHT CONDUCTING ELEMENT AND A RESILIENTLY DEFORMABLE SHEET

[75] Inventor: Richard M. White, Berkeley, Calif.

[73] Assignee: The Regents of the University of California, Berkeley, Calif.

[21] Appl. No.: 680,759

[22] Filed: Dec. 12, 1984

[51] Int. Cl.⁴ .............................................. H01J 5/16
[52] U.S. Cl. .................................. 250/227; 340/407; 901/33
[58] Field of Search .................... 250/227; 340/347 P, 340/780, 365 P, 407, 825.19; 901/46, 47, 33; 350/96.23

[56] References Cited

U.S. PATENT DOCUMENTS 3,624,619 11/1971 Ambrosio ........................ 340/347 P
4,484,179 11/1984 Kasday ................................ 250/227

FOREIGN PATENT DOCUMENTS 2058394 4/1981 United Kingdom ............ 350/96.23

OTHER PUBLICATIONS

J. D. Chodera and M. Lord, "Retraining of Standing Balance Using a Pedobarograph," Proceedings of the Sixth International Symposium on External Control of Human Extremities Aug. 28-Sep. 1, 1978, Dubrovnik, pp. 333-341.
"Automated Tactile Sensing"—L. D. Harmon International Journal of Robotics Research, vol. 1, No. 2, 1982 pp. 3-31.
"Micron Eye" Operator's Manual Micron Technology, Inc., Boise, ID. pp. 1—1 to 1-3.

Primary Examiner—David C. Nelms
Assistant Examiner—S. Allen
Attorney, Agent, or Firm—Phillips, Moore, Lempio & Finley

[57] ABSTRACT

A tactile sensing device for use in robotics and medical prosthetics includes a transparent sheet-like element and a second resilient sheet-like element positioned adjacent the first transparent element. A light detection and imaging means is positioned to observe the interface between the two elements. A light source is provided to illuminate the interior of one of the two elements. Any object pressing against the resilient element deforms the same into contact with the transparent element. Areas of contact caused by the pressing object produce a lighted area that can be detected by the light detecting means. The output from the light detecting means may be processed by a computer and an image of the contact area produced by the pressing object can be displayed on a monitor or processed to operate an electromechanical control.

8 Claims, 14 Drawing Figures

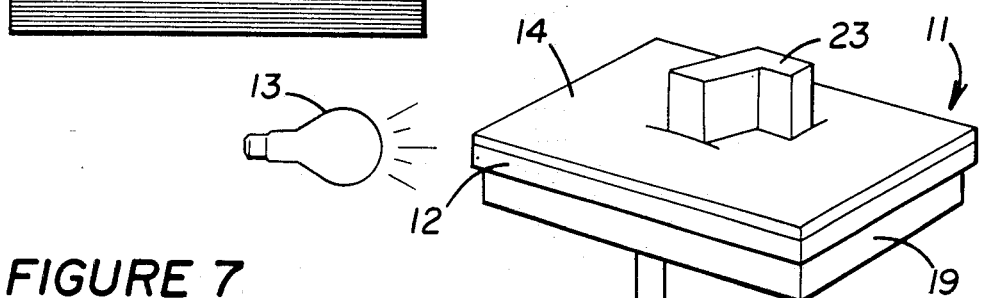
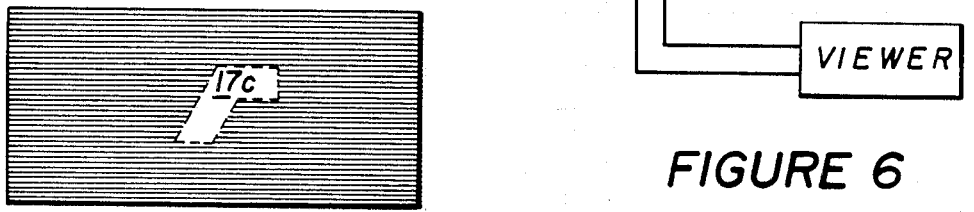
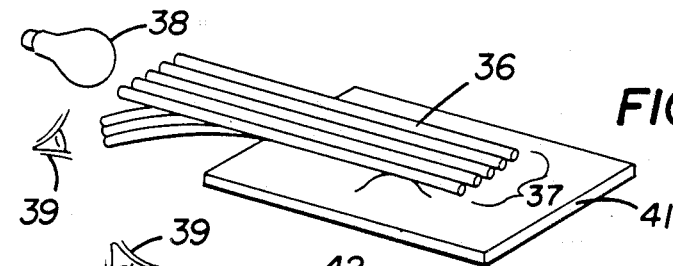
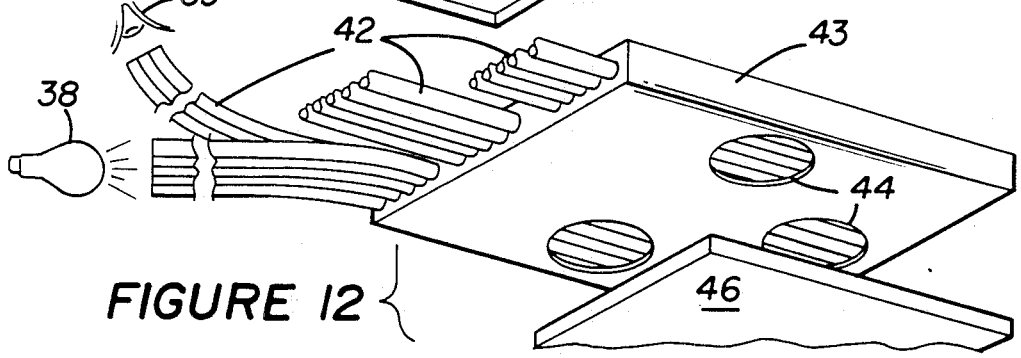

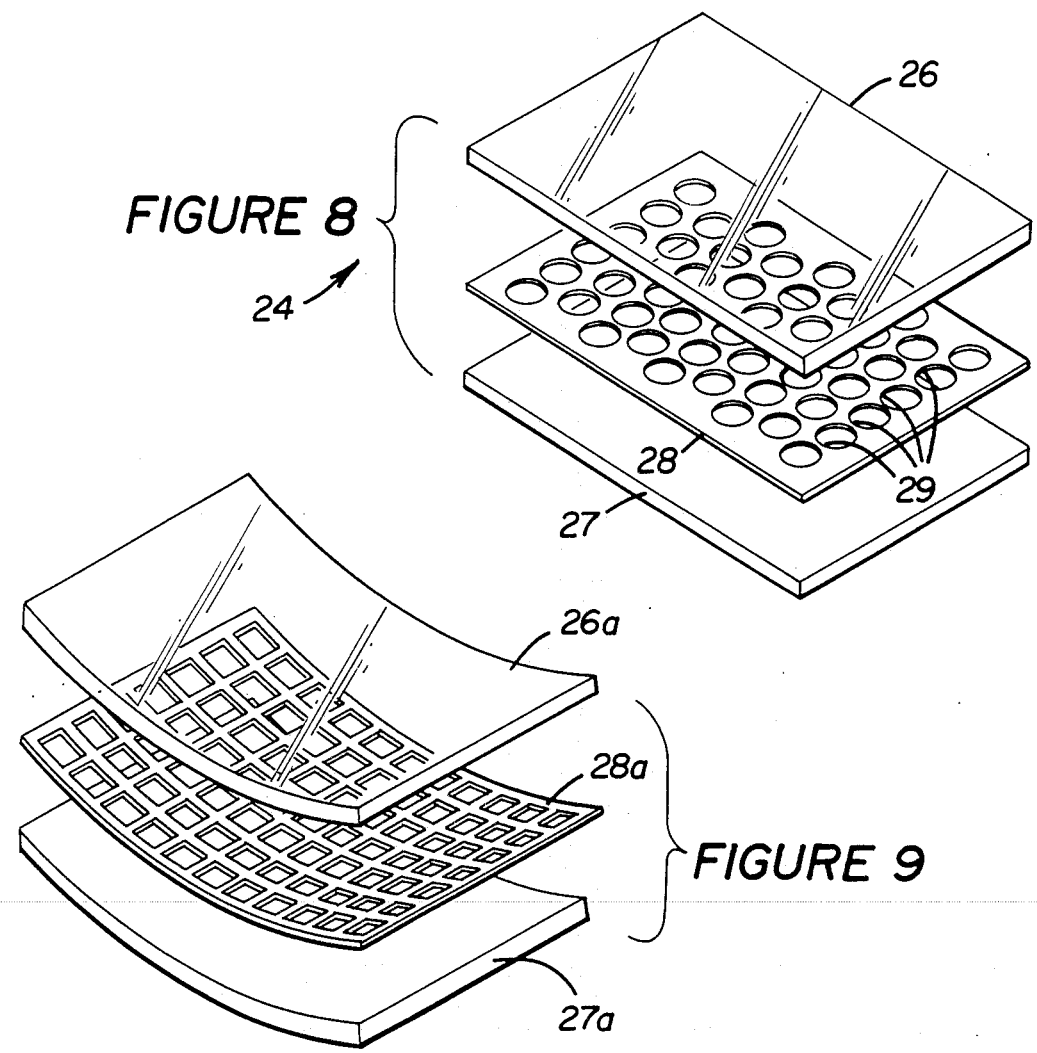
FIGURE 8
FIGURE 9
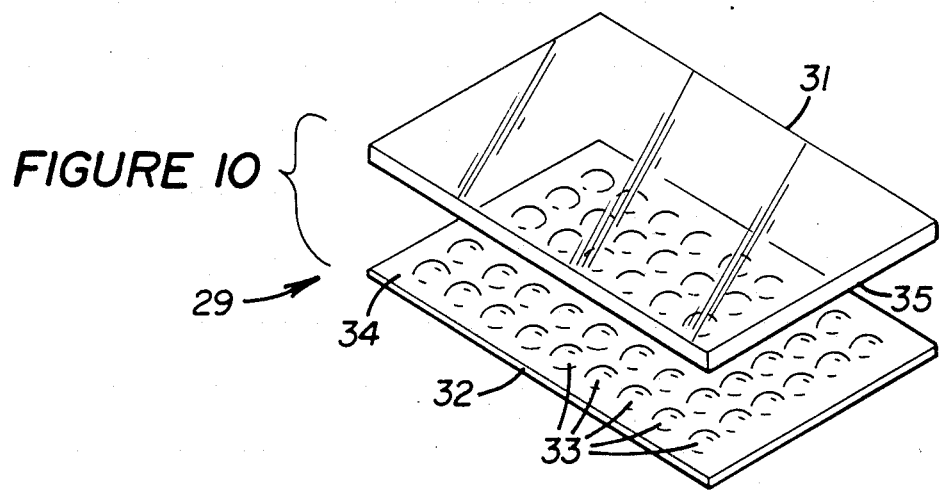
FIGURE 10

TACTILE SENSOR EMPLOYING A LIGHT CONDUCTING ELEMENT AND A RESILIENTLY DEFORMABLE SHEET

BACKGROUND OF THE INVENTION

With the advent of sophisticated electronic circuitry, high speed solid state devices, optical techniques, and related hardware, the problem of high labor costs in the production of high quality, high volume industrial parts has begun to be solved. Robots utilizing these sophisticated devices and computing tools have been finding rapidly increasing use in many industries where highly repetitive tedious operations can justify the relatively high expense. Although very sophisticated by standards for robots of only a decade or two ago, industrial robots are still in their infancy in their ability to perform fairly complicated and complex operations. Where only visual orientation is necessary, sophisticated optical devices, such as vidicon tubes, laser scanners, and the like, have provided practical and excellent abilities for robots to solve maneuvering and space oriented problems.

However, state-of-the-art industrial robots are severly deficient in tactile sensing means. No satisfactory, simple, efficient, low-cost means have yet been devised to serve the purpose of the human hand in its ability to provide information relating to object shape, grasping force, slipping motion, etc.

The medical profession, similarly to highly automated industries, has also made great progress in providing useful protheses to replace missing or disabled body parts for human patients. Such protheses utilize strong light weight materials, small energy conservative motors, ingenious mechanicals and life-like plastics to achieve use and function unknown until recent decades. However, one area where a great deal of progress remains to be made, is in sensor mechanisms to replace or mimic an appendage, e.g., the human hand and foot as it relates to tactile sensing of position, pressure, slippage, etc. As yet no satisfactory prosthesis that can sense the above requirements has been devised, at least in a small, compact, simple form.

Many manipulative operations require actions that depend upon a sensing of pressure; a sensing of pressure in relation to an area, i.e., pressure distribution over a predetermined area; a sensing of the presence or absence of pressure over a predetermined area; the sensing of the variations in the strength of pressure in the entire area wherein pressure is being exerted; and the presence or absence of slip in relation to a pressure point or pressure area. All of the above-mentioned and other physical qualities, with attendant feedback systems, have been admirably addressed and solved by the human hand.

From the standpoint of robotics and medical protheses, a "human hand-like" apparatus would be an extremely important and vital apparatus essential to the advancement of the art.

BRIEF DESCRIPTION OF THE INVENTION

The present invention relates to tactile sensors for use both in industry and in medicine; or wherever there is a need for tactile sensing devices. The invention tactile sensor is quite simple in concept and implementation, but extremely versatile in its range of applications.

More specifically the sensor comprises an element that has the property of conducting or "piping" electo-magnetic radiation, especially in the visible or near visible, i.e., ultra-violet and/or infra-red light through its interior volume wherein the "piped" light is internally reflected to pass continually through the interior of the light conducting element. As used herein the term "light" shall include visible, ultra-violet and infra-red radiations. A second element comprising a resilient or pressure transferring material, e.g., an elastomer or rubber-like material, is positioned adjacent to at least a portion of the exterior surface of the light conducting element.

If the resilient element, or a portion thereof, is forced against the surface of the light conducting element, the internal reflection characteristics of the light conducting element are altered at the point, or areas of contact. This compression of the resilient element against the light conducting element may occur when an object of some sort is placed upon the sensor, or when the sensor is moved against an object, or when an object is grasped by a mechanical device of which the sensor is a part.

If any event, when the resilient element is forced against, or bears up against a portion of the light conducting element's surface, the light reflection characteristics are altered, and a portion of the light passing therethrough will be reflected at such an angle that is passes out through an opposing surface rather than continuing to be "piped" as it would under normal circumstances. Any light thereby passing out of the light conducting element is then detected by a suitable means, e.g. an electronic optical sensor suitable for detecting and/or recording the light signal, whether in the visible, ultra-violet or infra-red ranges, as may be appropriate. The signal detected will be indicative of the shape and size of the area where the resilient element is pressed against the light conducting element's surface.

The information received from the optical sensor can then be electronically processed to provide a picture of the area on a video screen, or it may be utilized to operate or regulate electro-mechanical servo devices to control the movement of a grasping device in response to the information obtained from the tactile sensor i.e., to provide "feed back" for controlling the operation of the device. In fact, the tactile sensor would normally be an integral part of the grasping device.

In some embodiments of the sensor as described hereinafter, the light conducting and resilient elements may be combined into a single element. In such embodiments, a second transparent contact element is provided to afford contact with the combined resilient light conducting element.

A large number of modifications may be made to the basic sensor as outlined above to adapt it for use in a broad range of applications. Some of these modifications and adaptations will be discussed below.

It is an object of the invention to provide tactile sensing devices.

It is another object of the invention to provide tactile sensing devices for use in industrial robots.

It is another object of the invention to provide tactile sensing devices for use in medical prosthetics.

It is still another object of the invention to provide tactile sensing devices that include a light conducting element, a resilient element for contacting the light conducting element, and electronic light sensing means for optically determining the contact area between said light conducting element and said resilient element.

It is yet another object of the invention to provide tactile sensors that display a video image of the area where an object contacts said sensor.

It is still another object of the invention to provide tactile sensors that yield electronic signals or information that can be utilized to control the motion of a robotic device.

Other objects and advantages of the invention will be apparent upon review of the following specification, the drawings, and the claims appended hereto.

BRIEF DESCRIPTION OF THE DRAWINGS

In the accompanying drawings:

FIG. 4 is a schematic view of an embodiment of the sensor in operation with an object in contact therewith.

FIG. 5 is a schematic illustration of the appearance of the sensor contact area produced by the object in FIG. 4.

FIG. 6 is a schematic view of an embodiment of the sensor in operation with a different object in contact therewith.

FIG. 7 is a schematic illustration of the appearance of the sensor contact area produced by the object in FIG. 6.

FIG. 8 is an exploded view of an embodiment of the sensor.

FIG. 9 is a schematic view of yet another embodiment of the sensor.

FIG. 10 is a schematic view of still another embodiment of the sensor.

FIG. 11 is a schematic view of another embodiment.

FIG. 12 is a schematic view of a sensor utilizing the embodiment of FIG. 11.

DETAILED DESCRIPTION OF THE INVENTION

The invention comprises tactile sensing devices wherein an object grasped or held will produce a detectable image that directly reflects the object's pressure and pressure pattern upon the device. The image is detected by suitable video camera elements and then transmitted for further processing to give direction to a robotic mechanism. This invention is only concerned with the sensor and not with the processing of the data and its use in directing robotic mechanisms which can be accomplished by means well known in the art.

As used herein "tactile sensing" or "tactile sensor" refers to the touching or grasping of any object and the device or instrumentality that makes the touching or grasping available as visual information that can be further processed for controlling touching or grasping devices. The tactile sensor replicates visually much of the same information that is revealed when an object is touched or grasped by a human hand.

The basic elements of the tactile sensor device include a light conducting element, a resilient element adjacent and co-extensive the light conducting element, and a light detecting and imaging device adapted to view the light conducting element and the resilient element from a position where any contact between the two elements can be detected.

Figure 1:
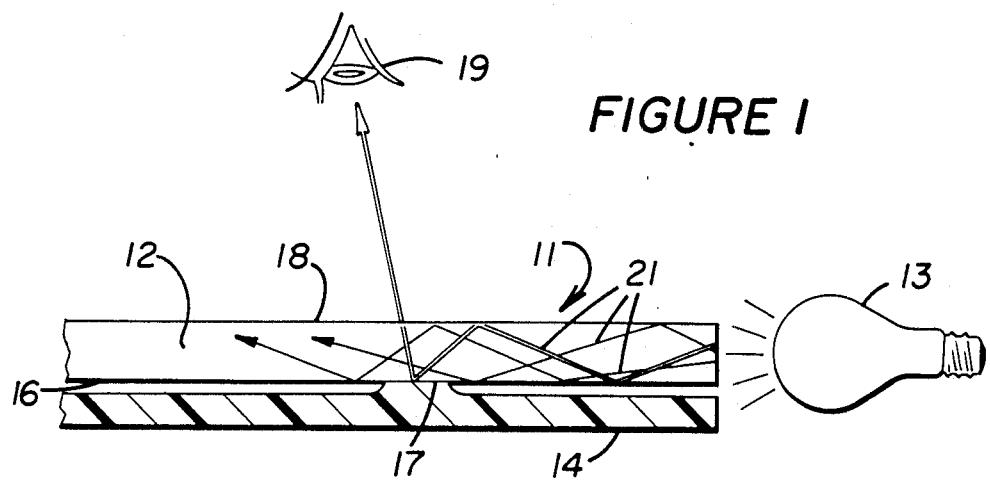
FIG. 1 is a schematic view of a tactile sensor illustrating the principles upon which the invention operates.

The basic elements of the tactile sensor and its principle of operation may be understood by reference to FIG. 1 of the drawing. Specifically, the tactile sensor 11 comprises a light conducting element 12 which has an edge thereof illuminated by a light source 13. Light source 13 is only shown schematically, but it may be simply natural light, or more usually a suitable incandescent or fluorescent lamp.

Light conducting element 12 may be of any suitable configuration as will be more fully described hereafter, but for the purposes of illustration may be of a sheetlike shape. Positioned adjacent one surface 16 of the sheetlike light conducting element is a resilient element 14. When contacted by an object (see for instance, FIGS. 4 and 6), a portion of the resilient element 14 will be pressed against surface 16 as shown at area 17.

Positioned adjacent the opposite surface 18 of element 12 is a light detecting and imaging device 19 (shown schematically in FIG. 1 as an eye).

Light conducting element 12 may be fabricated from any number of transparent or semi-transparent materials that have the ability to confine light within their volumes. Materials such as organic polymers like the acrylates or methacrylates, or glass fibers utilized in fiber optics, are several illustrations of suitable materials. These materials have the property of reflecting any internal light from their surfaces whereby the light is confined or piped within the volume of the light conducting material. In any event, element 12 is fabricated from some such light conducting or piping material.

Where desirable in some applications of the sensor, contrast at the contact areas between the light conducting element and the resilient element can be enhanced by fabricating the light conducting element from plastic materials having dye, especially fluorescent dye, impregnated therein. Such dye impregnated plastic will provide greater uniformity of illumination throughout its volume. Fluorescent dye impregnated sheet material is commercially available and may comprise methyl methacrylate impregnated with a fluorescein or fluorescein-type dye. Such dye impregnated plastic sheet is readily excited by visible light. Most of the light emitted by the excited dye molecules is trapped within the confines of the sheet and will produce lighted areas of good contrast when the resilient element is pressed against it as described herein. This means of enhancing the illumination provides particularly uniform lighting over a large area of the light conducting element.

Resilient element 14 may be fabricated from any resilient, deformable material. Any elastomer, rubberlike, or skinlike material is suitable. Silicone rubbers, natural rubbers, or synthetic rubbers, or soft resilient organic polymers, such as polyethylene or polyurethane serve this purpose quite well. The prime requirements for such resilient elements are compressiblity, resiliency, toughness, and preferably, a light color such as white or yellow, to maximize the reflection of light from contact area 17.

Resilient element 14 essentially forms a "skin" covering one surface of the light conducting element 12. However as hereinafter described the resilient element 14 is not normally in contact with light conducting element 12; or if normally in contact, then only at preselected limited areas as will be hereafter explained.

Light detecting and imaging device 19 may be any device that is capable of viewing a light image and recording or transmitting the same for further processing or use. Normally for the purpose herein the smaller and more compact the device is, the better. One solid state electro-optical device that is useful for the present purpose is known as the "OpticRAM" produced by Micron Technology, Inc., of Boise, Id. The active element of the OpticRAM is a silicon dynamic random-access memory (RAM) chip of small dimensions perhaps 7/16 inch by 3/16 inch by 1/64 inch. Its protective package, usually fitted with a transparent cover, measures approximately ⅜ inch by ⅝ inch by 3/16 inch. It is composed of 65,536 individual image sensing elements or pixels. The pixels are organized into two rectangular arrays of 128×256 pixels each. Each array is separated by an optical dead zone of about 25 elements in width. The arrays are covered by an optically clear window and a number of electrical connectors on the back permit connection with a computer and video display. Any light image viewed by the OpticRAM generates a digital representation thereof. This digitized representation is transmitted via suitabale software into a computer and from thence to a display on a video screen. Any other similar electro-optical imaging device such as a charge-coupled imager may be used as the light detecting and imaging device 19.

In operation, and as schematically shown in FIG. 1, the light rays 21 from light source 13 enter an edge of light conducting element 12. The rays 21 are normally channelled through element 12 by internal reflection from surfaces 16 and 18. However, those rays reflected at the resilient element contact area 17 have their reflection angles altered whereby at least a portion thereof emerge from surface 18 and impinge upon detecting and imaging device 19. Thus device 19 can detect an area, or areas, wherein resilient element 14 is in contact with light conducting element 12.

It will be understood that the Figures are schematic illustrations. Variations in illuminating the light conducting element are contemplated. Thus the light source 13 can be located at a position normal to the general plane of element 21, and if the external edge is beveled and silvered, light from the source 21 can be directed into the interior.

Figure 3:
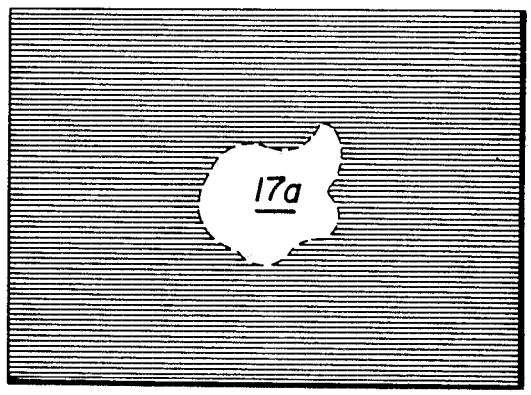
FIG. 3 is a schematic illustration of the appearance of a contact area as viewed through the sensor device.

FIG. 3 schematically illustrates the type of image produced by the above described effect. As seen by device 19, the area of contact 17a will appear as a bright area in contrast to the uncontacted area of element 12. The bright area of contact 17a is indicative of the shape of a pressure area exerted by any object resting upon or grasped by the tactile sensor. For instance, as illustrated in FIGS. 4 and 5, a round object 22 will produce a round contact area 17b; whereas an angular object 23 as shown in FIG. 6 will produce an angular contact area 17c as shown in FIG. 7.

It will also be apparent that due to the resilient nature of element 14, the harder an object is pressed against the sensor 11, the larger will be the characteristic light area viewed by image detecting device 19; and vice-versa.

Additionally, it will also be apparent that light areas 17a, b, c, will define the exact position in which the object is contacting the sensor; that is, as the object moves about on the resilient element, the position of light area 17a, b, c, will move in correspondence thereto.

Slippage of a grasped object is also detected by the sensor. If an object begins to slip across the viewed area, light of contact area 17 will begin to change position and move across the viewed area or its representation on a display screen. This will warn that the object is slipping and suitable measures can be taken to tighten the grasp of the electro-mechanical mechanism in which the sensor is being used.

Heretofore the most simple embodiment of the tactile sensor has been described. Upon further consideration; it will be apparent that the resilient element 14, unless restrained, may randomly contact the light conducting element 12 even in the absence of external pressure. This is possible in view of the resilient nature of element 14, its own weight and elasticity. Random contact of the light conducting element 12 is to be avoided since such contact may give rise to spurious or false contact areas. The production of such spurious or false signals is avoided by introducing a spacer between the resilient element 14 and light conducting element 12; or by building an effective spacer means directly into the resilient element 14 or light conducting element 12.

More specifically and as shown in FIG. 8, a tactile sensor 24 comprises a light conducting element 26 and a resilient element 27, like those previously described. Interposed between the two elements in a thin spacer 28. Spacer 28 is provided with a plurality of holes or apertures 29 arrayed over the entire surface thereof. Spacer 28 is fabricated from any dimensionally stable, thin sheet material such as paper, metal, plastic or the like. Spacer 28 is quite thin relative to the thickness of elements 26 and 27, being of the order of perhaps 2–5 mils. The surface of spacer 28 adjacent light conducting element 26 is non-sticky and preferably has a very finely pebbled or fibrous texture (as in paper) so that contact with element 26 is minimized and does not result in a light generating area.

Since spacer 28 is interposed between light conducting element 26 and resilient element 27, no contact between the two elements can occur unless pressure is brought to bear against resilient element 27. If an object is forced upwards against resilient element 27, those portions overlying holes 29 will be forced therethrough and into contact with element 26. Where such contact occurs light generating areas will develop. Should the pressure be released, the resilient material will withdraw from the surface of element 26 and holes 29. Therefore, spacer 28 removes the possiblity of spurious signals being generated between the two elements, 26 and 27. Spacer 28 also permits use of a plane sheet of resilient material rather than a contoured sheet as would be necessary in the embodiment illustrated in FIG. 10, below.

As illustrated in FIG. 9, the spacer may take many forms. In FIG. 9, the spacer 28a is punched out to form a grid-like structure wherein the grid serves to separate light conducting element 26a from resilient element 27a. Spacer 28a in FIG. 9 performs the same function as does spacer 28 in FIG. 8. With further reference to FIG. 9, it should be noted that the tactile sensor can be formed into a curved surface. Such curved surface can simulate the curved grasping surfaces of a human finger, or any other desired curved grasping surface. Any such curved tactile sensor will still remain operationally functional so long as suitable means such as spacer 28 or 28a, are provided to separate the light carrying and resilient elements.

Figure 2:
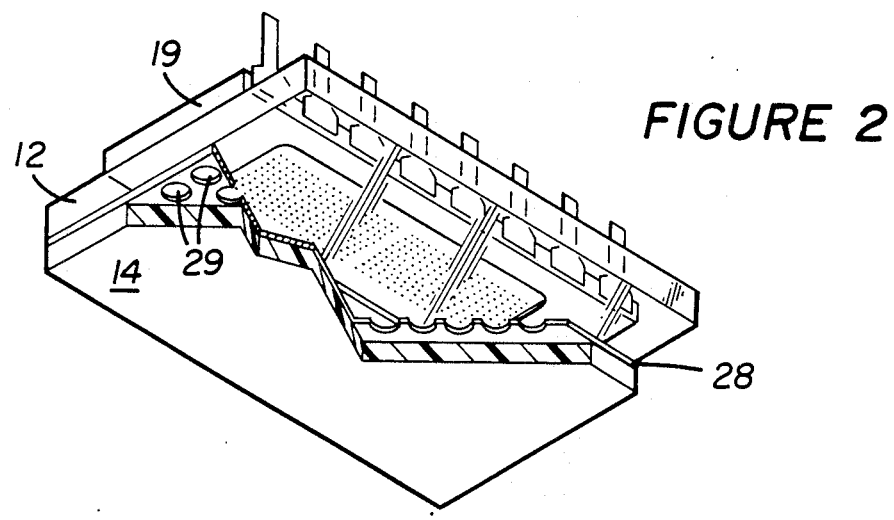
FIG. 2 is a cutaway perspective view of a sensor device of the invention.

FIG. 2 is a perspective cutaway view of an assembled tactile sensor unit. As shown therein light detecting and imaging device 19 is placed closely adjacent the back surface of light conducting element 12. Connectors lead from device 19 to a computer (not shown). A spacer 28, as previously described, is placed against the opposite surface of element 12 and serves to separate resilient element 14 therefrom. Apertures or holes 29 are arrayed in spacer 28 to permit resilient element 14 to press against light conducting element 12 when an object (not shown) bears against any area of resilient element 14.

FIG. 10 illustrates another embodiment of the tactile sensor. In this embodiment, the sensor 29 comprises a light conducting element 31 identical with those previously described. A resilient element 32 is also provided, however it differs from the resilient elements previously described in that a plurality of bumps or projections 33 are integrally formed on the surface 34 and facing the light conducting element. Bumps 33 may be in any form suitable for spacing the surface 34 a slight distance away from the adjacent surface of element 31 when the two element are brought into contact.

The points at which bumps 33 contact element 31 will produce a regular pattern of small light areas as previously described, however the major portion of surface 34 will remain out of contact. If, however, an object is placed upon, or is grasped by the tactile sensor, a number of the bumps corresponding to the pressure areas will be compressed allowing the contiguous portions of surface 34 to contact light conducting element 31. As previously described, such pressure contact areas will produce light areas corresponding to the pressure areas. Larger light areas will then be visible to the light detecting and imaging device (not shown) positioned above element 31.

Thus the embodiment shown in FIG. 10 is capable of yielding the same type of information as the embodiments of FIGS. 8 and 9, without the necessity of a separate spacer interposed between the light conducting element and resilient element.

With respect to the embodiment of FIG. 10, it will be apparent that the lower surface 35 of light conducting element 31 may be provided with protruding bumps, while the upper surface 34 of resilient element 32 may be smooth, i.e., the configurations of light conducting element 31 and resilient element 32 are reversed. The advantage of such an arrangement in this embodiment may be economical. Specifically, with use, the resilient element 32, being the exterior member of the sensor, will tend to receive greater wear from contact with external objects. It may become abraded, torn etc., necessitating replacement. In such event, a simple planar sheet of resilient material will be much less expensive than a contoured resilient sheet. Therefore the cost of replacement will be less.

It will be apparent that a large number of modifications may be made to the tactile sensor as previously described to ensure the separation of the resilient element from the light conducting element in the unloaded mode. FIGS. 2, 8, 9, and 10 illustrate several methods of ensuring separation, however, variations thereof are contemplated as being part of this invention.

The sensors of the invention are also capable of the detection and display of forces (shear) applied tangentially to the surface of the resilient element. For instance, with reference to FIG. 10, a shear force applied to the lower surface of resilient element 32 will cause the points of contact with light conducting element 31 to be translated in the direction of the force. This movement of the contact points in a transverse direction can be detected by the imaging device. In addition, the contact areas will be oval in configuration rather than circular as would be the case when force is applied normally to the surface of element 32. The long axis of any such oval contact areas will be parallel to the direction in which the transverse force is applied to element 32.

Figure 13:
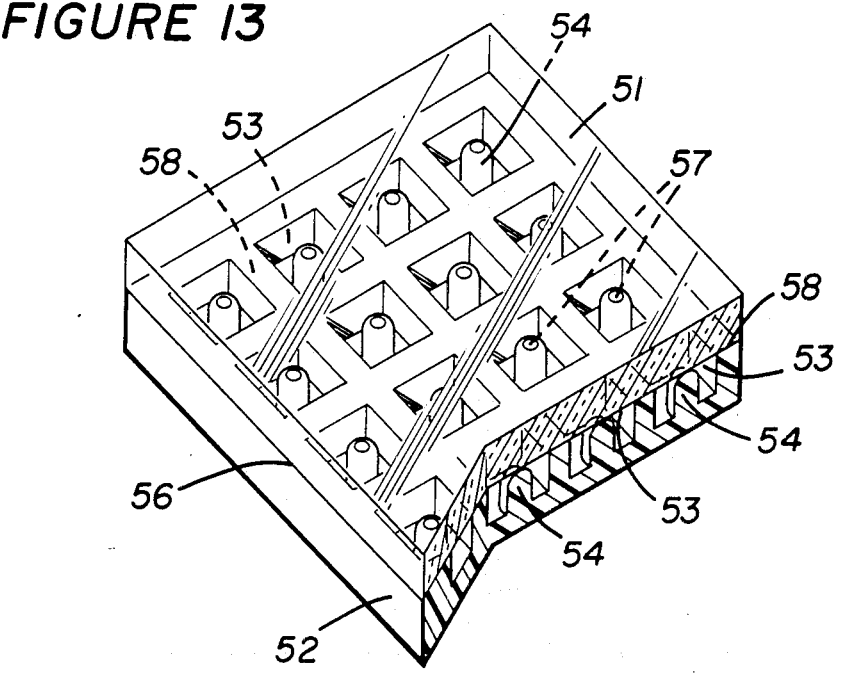
FIG. 13 is a cut-away perspective view of a sensor especially adapted to detect and display shear forces applied to the sensor surface.

FIG. 13 illustrates an embodiment of the sensor especially adapted to detect shear forces. As shown therein a light conducting element 51 overlies a resilient element 52. Resilient element 52 includes a plurality of recesses or cells 53 which may be generally rectangular or square in the plane parallel to the sensor. Each recess 53 includes a rounded nipple or projection 54 centered within the recess, and extending upwardly from the recess bottom to a height co-extensive with, or slightly higher than the upper surface 56 of resilient element 52. The upper surface 56 of element 52 is affixed, by means of an adhesive to the under surface of light conducting element 51. However the tips of nipples 54, although in contact with element 51, are not adhered thereto, but are free to move across the undersurface.

Application of transverse force on the underside of resilient element 52 will cause the contact areas 57 between the tips of nipples 54 and the light conducting element 51 to move relative to the contact areas 58 between the upper surface of resilient element 52 and light conducting element 51. Thus any transverse force applied to the resilient element will be detectable from observing the movement of areas 57 relative to the fixed areas 58.

It will be appreciated that in some applications it is useful to provide open viewing areas through the sensor light conducting element and resilient element. That is, portions of the sensor elements may be removed so that the light detecting element has at least a portion of its view unimpeded by the light conducting element and resilient element. In such open areas the light sensitive pixels of the light sensitive element will be available for conventionally viewing objects which are being gripped, or are to be gripped by the robotic device. Thus the robotic device can be used in a simple viewing mode concurrently with the tactile sensing elements.

The tactile sensors can also be provided in a flexible form for use, for instance, as a "glove" covering a mechanical "hand" prosthesis; or as a sensor "glove" adapted to fit over a hand that has been nerve damaged.

FIG. 11 schematically illustrates in brief detail a flexible embodiment of the tactile sensor. As illustrated therein a plurality of light conducting fibers 36 (like those utilized in light fiber optics) comprise the light conducting element previously described. The light conducting fibers are arrayed side by side in a flat sheet 37 which may be as wide and as long as desired. A light source 38 illuminates the fibers at one end thereof. The other ends of the fibers may be silvered to reflect the light back in the direction of the source. A light detecting and imaging device 39 (depicted schematically as an eye) is positioned at the light entry end of the fibers to observe the light reflected back from the silvered ends.

A resilient element or "skin" 41 is positioned across the fiber array 37 such that when depressed by a grasped object, at least a portion of the resilient element will press against the fiber array. The contact area with the fibers alters the reflection characteristics of the fibers and the reflected light signal is thereby altered to indicate to the light detecting device 39 that a portion of the resilient element 41 is pressed against the fiber array 37.

It will be appreciated that the fibers 36 and the array 37 thereof are quite flexible and may be bent or folded into desired configurations. The flexible tactile sensor is suited for application to a hand prosthesis where the flexible sensors can be arranged to provide tactile information in the fingers of a glove-like covering for an electro-mechanical hand or nerve damaged human hand.

FIG. 12 illustrates the manner in which a plurality of flexible sensors can provide tactile information at various positions over a grasping prosthetic surface. As shown therein, a number of light fiber arrays 42 are encased in a flexible enclosure 43. Enclosure 43 may be any suitable flexible material such as silicone rubber, rubber-like polymers, etc.

A number of openings 44 are provided at predetermined positions over the surface of enclosure 43. These openings expose a respective array of the light fibers 42. In the event the light fibers are clad with a light reflective or protective coating, said coating is removed where the fibers are exposed at openings 44.

A flexible skin 46 of resilient plastic is provided to cover the enclosure 43 and overlie openings 44. If an object grasped by the prosthesis underlies one of the openings 44, a portion of skin 46 will be forced through the corresponding opening and against the exposed fiber array. Contact of the skin against the array will alter the reflected light signal passing through the array and light detecting device 39 will reveal that the skin 46 has been forced against the array at a particular point over the surface of the prothesis. Thus it can be determined at exactly what point, or points, over the prosthesis surface, contact is being made with a grasped object. By such an arrangement, the tactile sensors of the present invention can simulate the nerve endings and tactile information of a human hand, for instance.

In the embodiments of the tactile sensor heretofore discussed, a relatively rigid element is utilized as the light conducting member, and a resilient element is utilized as the outer tactile contact. It is possible however to combine the light conducting function into the outer resilient element and utilize a transparent backing or contact member to define tactile contact areas. This variation of the tactile sensor will be apparent from a review of FIG. 14 of the drawing.

Figure 14:
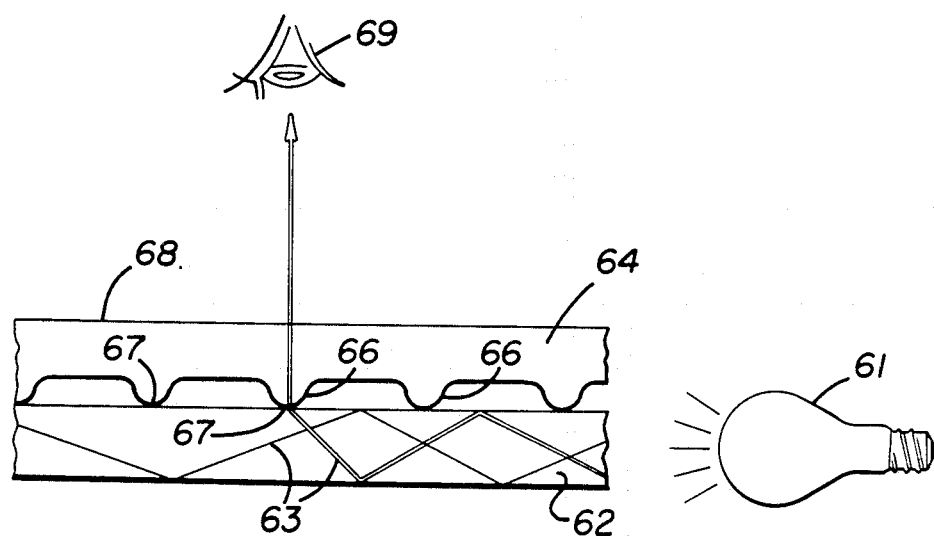
FIG. 14 is a schematic view of a variation in the sensor device wherein light conducting and resiliency are combined in a single element.

As illustrated in FIG. 14, a light source 61 illuminates a resilient and light conducting element 62. Element 62 is of an essentially sheet-like configuration. It is preferably fabricated from a clear, transparent rubbery material such as silicone polymers, or silicone methacrylate co-polymers. Such materials have resilient rubbery properties but also effectively transmit light therethrough.

Light rays 63 pass into element 62 from the light source 61 and are internally reflected throughout the volume thereof. A second contact element 64 is positional adjacent to and coextensively with element 62. Contact element 64 is provided with a plurality of bumps or protuberances 66 on the surface thereof immediately adjacent element 62. The protuberances 66 serve to position the main portion of element 64 at a slight distance from element 62.

Any points of contact 67 between element 62 and element 64 will interrupt the internal reflection of light within element 62 and permit a portion thereof to pass into contact element 64. Any of such light passing into contact element 64 at an angle normal to the upper surface 68 thereof will pass through and be detected by a light detecting device 69 (herein schematically denoted by an eye).

It will be readily apparent that a force applied normally to resilient element 62 will force portions thereof between protuberances 66 up against contact element 64 to thereby increase the area wherein light is transmitted through contact element 64 to detector 69.

Other applications and arrangements the tactile sensors of the invention will become readily apparent to those having need of tactile information in robotic devices. All such variations and applications are intended to be encompassed by this disclosure.

I claim:

1. A tactile sensor device comprising:
   a first sheet-like element of light conducting material having opposed surfaces and an edge,
   a second sheet-like element, generally coextensive with said first sheet-like element,
   at least one of said sheet-like elements being resiliently deformable so that localized portions of said first and second sheet-like elements will contact each other in response to localized pressure applied to force the sheet-like elements towards each other,
   means for illuminating the interior of said first sheet-like element through said edge thereof,
   light detecting means generally coextensive with the first sheet-like elements and positioned on one side thereof to detect light exiting from said first sheet-like element through one of said opposed surfaces thereof.

2. The tactile sensor of claim 1, and further including:
   spacer means for separating said first and second sheet-like elements when said elements are not forced towards each other, said spacer means having a plurality of apertures therethrough to permit localized portions of said sheet-like elements adjacent said apertures to be pressed into contact with each other.

3. The tactile sensor of claim 1, wherein one of said sheet-like elements has a plurality of projections integral with a surface thereof and extending towards the other of said sheet-like elements.

4. The tactile sensor of claim 3, wherein the tips of said projections contact the surface of said other of said sheet-like elements to separate said sheet-like elements.

5. The tactile sensor of claim 3, wherein the tips of said projections contact the surface of said other of said sheet-like elements and can move along said surface in response to shear forces acting on said sheet-like elements.

6. The tactile sensor of claim 1, wherein said first sheet-like element is impregnated with a dye that is excited by light.

7. A tactile sensor comprising:
   a plurality of light conducting fibers arranged in side by side relationship, said fibers being grouped in arrays, each array having at least one fiber, the fibers of each array having their surfaces exposed at a point thereon, with the exposed surfaces of the arrays of fibers being at predetermined positions.
   a resilient element adjacent said arrays of light conducting fibers and being locally deformable into and out of contact with the exposed surfaces of the light conducting arrays of fibers in response to the presence or absence, respectively, of localized pressure exerted by an object, means for introducing light into the ends of the fibers of said arrays, means for detecting changes in the intensity of light in each of the arrays of fibers.

8. A tactile sensor as set forth in claim 7 and further including a spacer element disposed between said arrays of light conducting fibers and said resiient member, said spacer element having a plurality of apertures through which said resilient member may be pressed into contact with the exposed surfaces of said light conducting fibers.

* * * * *